United States Patent [19]
Gnann

[11] Patent Number: 5,739,660
[45] Date of Patent: Apr. 14, 1998

[54] PROCESS AND APPARATUS FOR MONITORING THE MOVEMENT OF A MACHINE COMPONENT

[75] Inventor: Alfred Gnann, Plochingen, Germany

[73] Assignee: Index-Werke GmbH & Co. KG Hahn & Tessky, Esslingen, Germany

[21] Appl. No.: 566,167

[22] Filed: Dec. 1, 1995

[30] Foreign Application Priority Data

Dec. 8, 1994 [DE] Germany .................. 44 43 669.6

[51] Int. Cl.⁶ .................. B23Q 17/22; B23Q 5/58
[52] U.S. Cl. .................. 318/626; 318/565; 318/652; 74/814
[58] Field of Search .................. 318/563, 565, 318/568.16, 568.24, 569, 574, 626, 652, 671, 264, 265, 266, 286, 466, 467; 74/814; 33/710

[56] References Cited

U.S. PATENT DOCUMENTS

| | | |
|---|---|---|
| 4,131,836 | 12/1978 | Noda . |
| 4,520,595 | 6/1985 | Diener . |
| 4,713,892 | 12/1987 | Strauss . |
| 5,585,053 | 12/1996 | Arai ......................... 264/40.1 |

FOREIGN PATENT DOCUMENTS

| | | |
|---|---|---|
| 043584 | 1/1984 | European Pat. Off. . |
| 2740793 | 3/1978 | Germany . |
| 3118065 | 11/1982 | Germany . |

OTHER PUBLICATIONS

Patents Abstracts of Japan, 13 (77), M-801 (Feb. 22, 1989) (JP-A-63278737, Nov. 16, 1988).

*Primary Examiner*—Bentsu Ro
*Attorney, Agent, or Firm*—Leydig, Voit & Mayer, Ltd.

[57] ABSTRACT

Process and apparatus for preventing collisions between two machine components, of which at least a first machine component is displaceable by means of a drive along a straight track relative to the second machine component such that the two components can collide, wherein for the simple and reliable prevention of such collisions a sequence of pulses is generated during movement of at least one of the two components relative to the other component by means of signal generating devices associated with the two machine components, namely such that the distance and/or the length and/or the height of consecutive pulses follows a function of the distance of the two components from one another, measured in track direction, and wherein the drive is controlled as a function of this sequence of pulses.

14 Claims, 3 Drawing Sheets

PROCESS AND APPARATUS FOR MONITORING THE MOVEMENT OF A MACHINE COMPONENT

The invention relates to a process and an apparatus for monitoring the movement of at least a first machine component moved by a drive along a predetermined path or track for avoiding any overtravelling of an end position admissible in relation to a second machine component. In particular, the invention relates to a process and an apparatus for preventing collisions between two machine components, of which at least a first machine component is displaceable by means of a drive along a straight path or track relative to the second machine component such that the two components can collide.

Typical for the collision problems mentioned in the aforesaid are machine slides or rather slides with assemblies (slide units) of machine tools, industrial robots and the like arranged thereon, which are arranged on a common guideway and displaceable along this guideway, when the areas of movement which are fundamentally possible for the slides or slide units overlap; for the operation of, for example, a machine tool collision possibilities must, however, often be considered also for a machine slide provided with a tool carrier in relation to stationary machine components, such as, for example, the headstock of a lathe. Collisions between two machine slides or rather the components carried by them or between a slide unit and a stationary machine component can cause considerable damage to the slide system and/or to the stationary machine component, in particular when the slide or slides is or are displaced along its or their track at a high speed, as is always the case, for example, with a tool carrier slide when it is moved without its tool being in operation (travel in the so-called rapid motion).

The risk of such collisions has so far been met, on the one hand, by suitable mechanical protective measures on the machine itself, on the other hand by an electrical/electronic monitoring of the movements of the machine components in the machine control.

Mechanical protective measures serve as passive machine protection; for example, elastic buffers at the critical points of impact protect the individual parts of the machine, and a slipping clutch between a displaceable machine component and its drive prevents the forces occurring during a collision from having an effect unlimited as to time; with the use of a modern monitoring system, such a slipping clutch also offers the possibility of detecting a collision. In some cases, the areas of movement of displaceable machine components can be restricted by constructional measures such that damage caused by collisions is kept small; above all, however, when several slide units are arranged on a common guideway and have overlapping areas of movement, the collision problem can be neither prevented nor mitigated by mechanical measures.

In the case of two slide units arranged on a common guideway, electrical or electronic monitoring systems switch off the feed drive of each slide unit, e.g. with the aid of proximity switches operating in a non-contact manner, when the distance between the two slide units falls below the safety limit. Due to this procedure, the areas of movement of the two slide units are, however, confined to a greater or lesser extent in the direction of their mutual approach, namely all the more, the greater the maximum track speeds of the two slide units are since, in such a case, the monitoring system must already respond when the distance of the two slide units from one another corresponds to the sum of the maximum required braking distances (at maximum track speeds) of the two slide units. The considerably shorter braking distances which are sufficient, for example, when the slide units are moved more slowly, namely at a so-called feeding speed, for operating or for treating a workpiece, are taken into account just as little as the case where one of the two slide units is not moved at all and, consequently, need not be braked until it comes to a standstill.

This is remedied by monitoring processes which are realized by means of corresponding control software for the machine control. These monitoring processes normally require not only that a machine has its own distance measuring system for each slide unit but also considerable expenditure on software development as well as a great deal of computer power during operation of the machine since, with these monitoring processes, position and speed analyses are constantly being made for each slide unit with the aid of the distance measuring systems and, based on these, distance analyses for both slide units in order to switch off the drive of one slide unit or rather the drives of both slide units when the distance falls below a safety limit which is dependent on the relative speed. Moreover, with these monitoring processes monitoring cannot be commenced until after a synchronization cycle of the entire system consisting of machine and control.

In the case of machines and, in particular, machine tools, the movement of a machine component moved along a track by a drive must, however, often be monitored also for reasons other than the risk of collision in order to avoid damage; for example, such a machine component is often connected via one or more lines with stationary parts of the machine in order to transfer control signals or energy, for example to a driven tool borne by the moved machine component, a tool turret to be indexed further and monitored with respect to its indexing position or a measuring element or sensor for measuring a workpiece or a tool. If the conventional monitoring of the movement of the driven machine component fails and this moves beyond an admissible end position, such lines can be damaged or even ruined. A typical case for this is a multiple-spindle automatic lathe with a workpiece spindle drum which can be indexed rotatively in steps about an indexing axis and the workpiece spindles of which not only have to be driven and brought to a standstill but also are equipped with workpiece chuck devices which have to be closed and opened. If control signals and energy are not transferred via sliding contacts or the like which allow the workpiece spindle drum always to be indexed further in the same direction of rotation and, therefore, also to be rotated through an angle of rotation of more than 360°, the workpiece spindle drum must be connected to stationary machine parts via lines which permit only a limited angle of rotation for the workpiece spindle drum. In this case, the latter is indexed back and forth in the manner resulting, for example, from EP-B-0 043 584; if the workpiece spindle drum has, for example, six workpiece spindles arranged at equal distances and, consequently, six indexing positions with a respective angle of rotation of 60° between them, the workpiece spindle drum will be indexed further five times through an angle of rotation of 60° each time and then turned back in one step through 300°. When a fault occurs in the indexing drive or in its control, it may then, however, be the case that the workpiece spindle drum travels over the fifth indexing position at full indexing speed and without any braking and, consequently, due to its considerable mass can no longer be stopped after a rotation through a total of 360° in such good time that damage to the specified lines can be avoided—the latter typically form a spiral which allows rotation through a total of 300° but will, in certain circumstances, be deformed when the workpiece spindle drum is rotated further such that it no longer assumes its old shape when the workpiece spindle drum is turned back.

Whereas, in the case of avoiding collisions between two machine components, that position of the driven machine component relative to the other component, which the driven machine component may either not travel past at all or at least not without any braking, is deemed to be the end position within the meaning of the preceding, introductory paragraph if a collision between the two machine components is intended to be prevented, the end position in the case of the multiple-spindle automatic lathe described in the above is to be understood as the last admissible indexing position or that angular position of the workpiece spindle drum which the drum may not travel over without any braking in order to avoid damage to the lines. However, the invention does, of course, also cover those cases, in which the machine components under consideration are both moved, and in this case the end position is to be understood not as a spatially fixed position but as a position of the one machine component relative to the other machine component.

The object underlying the invention was, therefore, to create a process and an apparatus, respectively, of the type specified at the outset, which make it possible, on the one hand, to prevent any overtravelling of the admissible end position in a simple manner and with great reliability, and due to which, on the other hand, the area of movement of the driven machine component or the areas of movement of the machine components is or are not restricted or only as little as is indispensable on account of the relevant operating situation.

This object may be accomplished in accordance with the invention, for a process of the type specified at the outset, in that a sequence of pulses is generated during a movement of the first component by means of signal generating devices associated with the two machine components, wherein the distance and/or the length and/or the height of consecutive pulses follows a function of the distance of the first component from the end position, measured in track direction, as well as of the relative speed of the first component in relation to the end position, measured in track direction, and that the drive is controlled as a function of this sequence of pulses, and, in particular, is stopped; it could, however, also be slowed down first of all or the drive direction could be reversed. If one of the two machine components is a stationary component, the signal generating device associated with it can, of course, also be provided on any other stationary machine component, e.g. on a machine frame.

The signal generating devices could, for example, be electro-optical signal generating devices operating on the basis of the determination of the travel times of optical signals. For this purpose, only a signal reflector would be required on one of the two machine components and the other signal generating device converts optical pulses emitted by the latter into electrical pulses having different distances and/or different lengths and/or different heights as a function of the travel time of these or rather the reflected pulses. As will result from the following, the inventive process can, however, also be realized with more simple means.

Since not only the distance of the driven machine component from the admissible end position or the distance of the two machine components from one another can be concluded from the sequence of pulses generated by the inventive process, but also the relative speed, with which the driven machine component approaches the end position or with which the two machine components approach one another, the shortcomings mentioned above not only of the known mechanical protective measures but also of the known electrical monitoring systems can thus be avoided.

It is clear from the foregoing that the inventive process can be designed, without forfeiting any advantages, such that the sequence of pulses is not generated until the distance of the driven machine component from the end position or of the two machine components from one another has fallen short of a predetermined distance since at a greater distance measures to prevent damage are not required.

The simplest way to realize the inventive process is with an apparatus of the type specified at the outset which is characterized by the fact that a support for a row of markings following one another in track direction is permanently associated with the end position or rather the first component and a sensor for scanning the row of markings as well as for generating a corresponding sequence of pulses—during a movement of the first component relative to the end position—is permanently associated with the first component or rather the end position, wherein the markings are designed such that the distance and/or the length and/or the height of consecutive pulses follows a function of the distance of the first component from the end position, measured in track direction, as well as of the relative speed of the first component in relation to the end position, measured in track direction, and that the sensor as well as the drive are connected to a drive control such that the drive is adapted to be switched off, switched over or braked, the first possibility being preferable, when a critical distance between first component and end position with respect to the relative speed is reached.

As is clear from the foregoing, the track, along which at least one of the machine components is moved, can be a straight track but also a circular track or any other, defined curved track. Also, it has already been pointed out that the said end position need not be a fixed position since this end position, in the case, for example, of two machine components moved along a common track, is dependent on the distance of the two components from one another and on the speeds, with which the two components move towards one another. Finally, even though it has been mentioned in the above in conjunction with the inventive apparatus that the row of markings and the sensor are permanently associated with the end position or the first component, this should not be understood only in the sense of spatially permanent since the row of markings and/or the sensor can also be moved together with one or other of the machine components.

As the invention would seem to have its greatest significance in conjunction with avoiding collisions between two machine components, the following comments are limited to this case.

In an embodiment of the inventive apparatus particularly favorable for this case, the one machine component is provided with the support and the other machine component with the sensor, and the apparatus is designed such that the drive can be switched off when a collision-critical distance between the two components with respect to the relative speed of the two machine components in relation to one another is reached.

As mentioned above, the pulse height could be modulated as a function of the distance between the components by operating, for example, with markings having different "intensities" and a corresponding sensor, such as, for example, with markings having different reflecting powers and an optical sensor designed as a transponder. The inventive apparatus does, however, become simpler and less expensive when the row of markings is designed such that the distances between consecutive markings become smaller in the direction of a decrease in the distance of the two components from one another and/or the length of the markings measured in track direction becomes smaller in the direction of a decrease in the distance of the two components from one another. In this case, it is then possible to operate with, for example, a sensor operating in a non-contact manner which is widely found in mechanical engineering in the form of an inductive or capacitive proximity switch which can scan metallic markings in a non-contact manner and with great functional reliability. In the case of any variation in the distances, for example, of the leading flanks of the markings only these flanks of the markings need be detected each time.

As already mentioned, the present invention has the greatest advantages in apparatuses, in which both components are designed as slides displaceable by separate drives on a common guideway, and a particularly favorable field of use of the invention is in apparatuses, in which the two components are tool carrier slides of a machine tool, in particular an automatic lathe.

The invention may be realized with the least possible control resources and great functional reliability in an apparatus which has an evaluation circuit for the sequence of pulses, the drive being adapted to be switched off thereby when, after detection of a pulse by the evaluation circuit, the evaluation circuit detects an additional pulse within a predetermined time interval or when the duration of a pulse detected by the evaluation circuit is shorter than a predetermined period of time.

For the very reason that a driven machine component would, in certain circumstances, travel past an admissible end position because of an error present in the machine control, i.e., for example, in the computerized numerical control of an automatically operating machine tool, embodiments of the inventive apparatus are preferred, in which a drive monitoring control separate from the actual machine control is provided for the monitoring of movement and, where required, the emergency braking of the driven machine component; this would also be included, where necessary, in the evaluation circuit mentioned above. This measure will increase the constructional resources required but this can be justified in all those cases, in which defects in the actual machine control or, for example, in drive intensifiers can lead to considerable material damage, as is the case, for example, in a multiple-spindle automatic lathe.

Additional features, advantages and details of the invention result from the following description as well as the attached drawings of a particularly advantageous embodiment of the inventive apparatus or the inventive process which are designed especially to prevent collisions between two machine components, the two slide units of this embodiment being tool carrier slide units of an automatic lathe simply by way of example; in the drawings.

Figure 3:
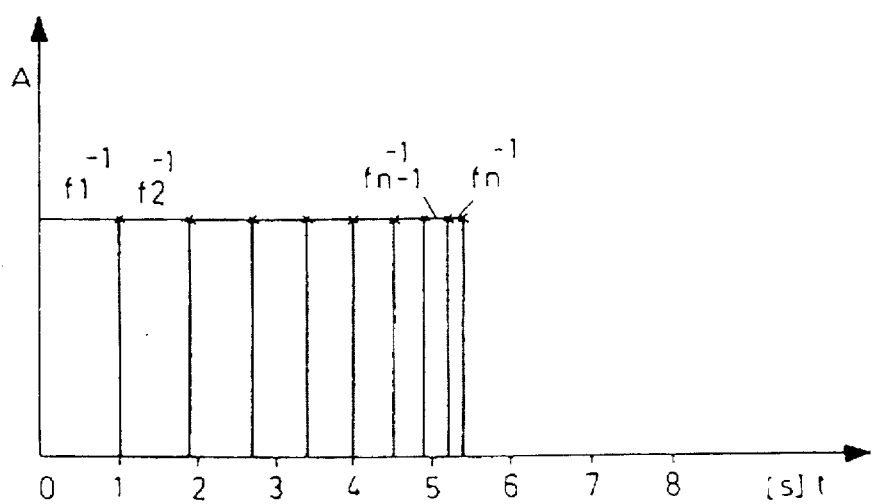
Figure 4:
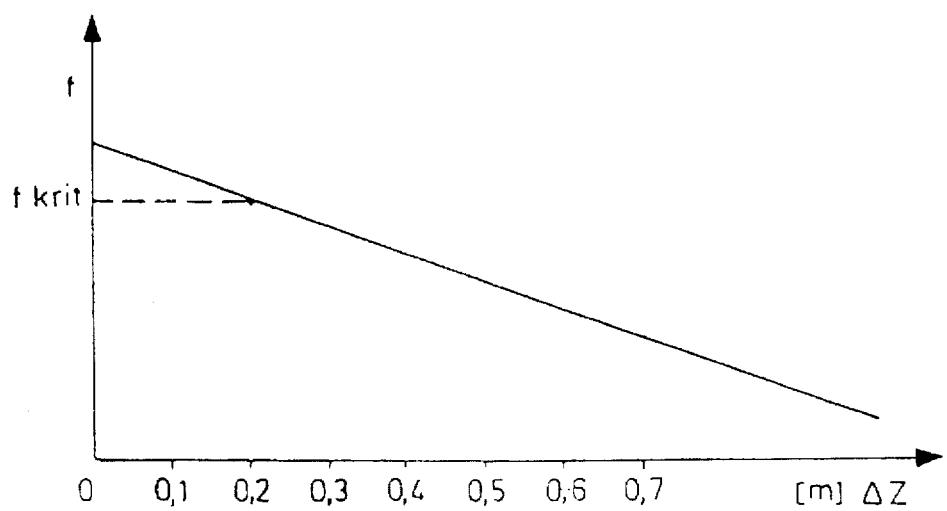

FIG. 3 is an illustration of the sequence of pulses in a modified embodiment of the inventive process, in which the pulses of the sequence of pulses are generated only by the respectively leading flanks of the cams in the direction of travel, namely for the case where the two machine components are approaching one another, and FIG. 4 is an illustration of the pulse frequency for this modified embodiment, namely as a function of the distance of the two machine components from one another at a constant approach speed.

Figure 1:
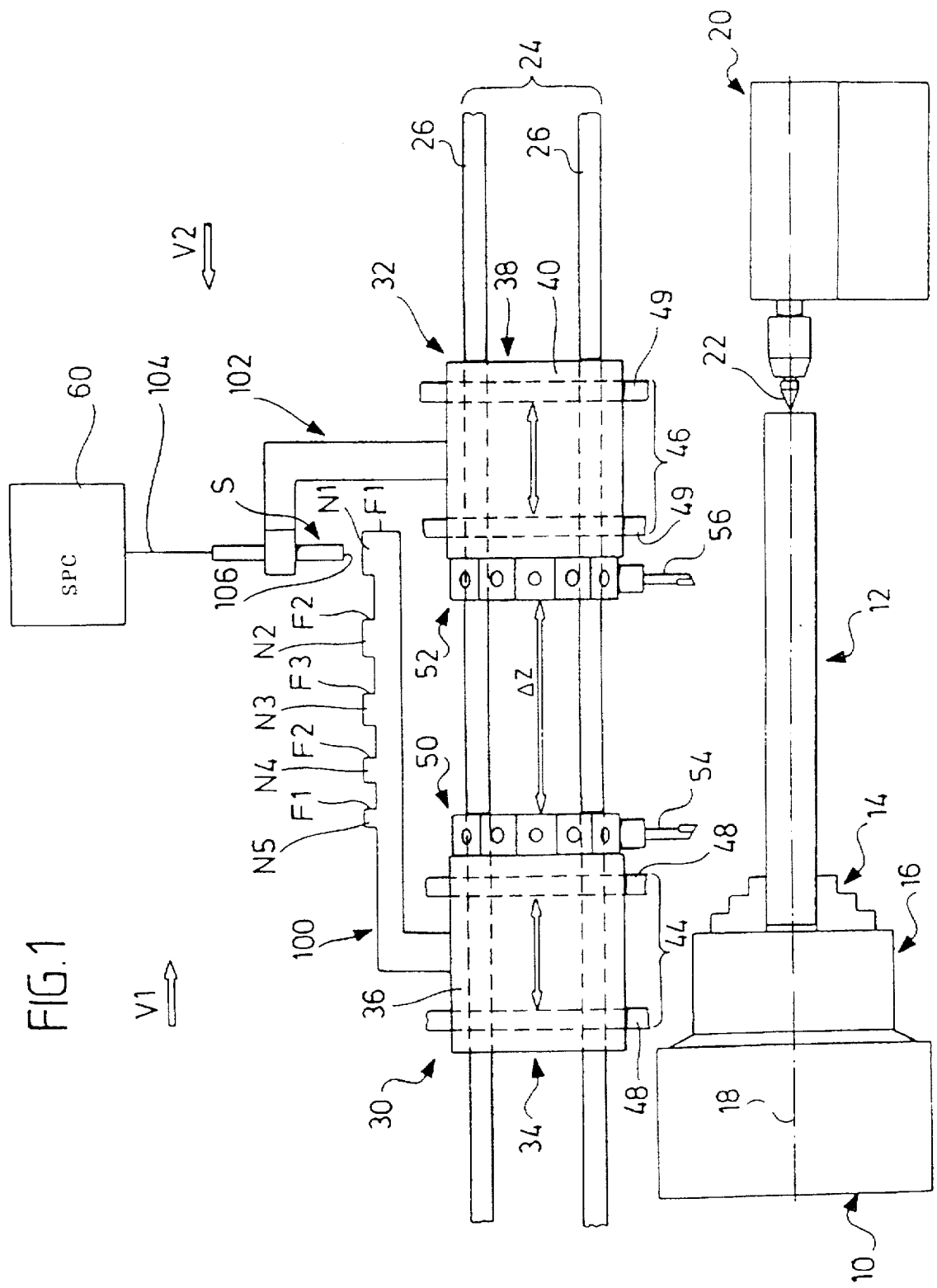
FIG. 1 shows a schematic illustration of the inventive apparatus in the preferred use of the invention on a lathe, namely together with the parts of the lathe designed as a CNC automatic lathe essential for understanding the invention.

FIG. 1 shows a headstock 10 of a CNC automatic lathe, in which a work spindle 16 holding an undulated workpiece 12 to be machined by means of a chuck device 14 is mounted for rotation about a spindle axis 18 and can be caused to rotate about this spindle axis by means of a drive which is not illustrated. Furthermore, FIG. 1 shows a so-called tailstock 20 of the automatic lathe which is located opposite the headstock 10 and is provided with a center 22 concentric to the spindle axis 18 in order to center the undulated workpiece 12 at its free end in relation to the spindle axis 18.

On a machine bed of the automatic lathe which is not illustrated, the latter has a so-called Z-guide 24 with two guide rails 26 which extend parallel to one another and parallel to the spindle axis 18—the spindle axis 18 defines the direction of the so-called Z-axis. The Z-guide 24 is common to two cross-slide systems, namely a first cross-slide system 30 and a second cross-slide system 32 which are both designed in a known manner and have not, therefore, been illustrated in detail. Each of these two cross-slide systems comprises in a known manner a lower slide and an upper slide which are located in the situation illustrated in FIG. 1 one above the other in a direction vertical to the plane of drawing in FIG. 1 so that the upper slide covers the lower slide when they have the same external measurements in the plan view. The lower slide of the first cross-slide system 30 has been designated as 34 in FIG. 1, the upper slide as 36, the lower slide of the second cross-slide system 32 as 38 and the upper slide as 40. The two lower slides 34 and 38, which are, therefore, in the illustrated embodiment the so-called bed slides, are both guided on the guide rails 26 common to both cross-slide systems for displacement in the direction of the Z-axis which has been indicated by a double-headed arrow in the region of both the respective cross-slide systems 30 and 32. Each of the two lower slides 34, 38 is provided with an X-guide 44 and 46, respectively, which is each formed by two guide rails 48 and 49, respectively, which are securely attached to the upper side of the lower slide 34 and the lower slide 38, respectively, and extend in a direction at right angles to the Z-axis, i.e. at right angles to the spindle axis 18, namely in the direction of the so-called X-axis. The X-guide 44 serves to guide the upper slide 36, the X-guide 46 to guide the upper slide 40 so that each of these upper slides is held so as to be displaceable in the direction of the X-axis relative to the lower slide 34 and 38, respectively, bearing it. Drives, with which the lower slide 34 and the lower slide 38 can be displaced in a controlled manner in the direction of the Z-axis and the upper slide 36 and the upper slide 40 in the direction of the X-axis, are not illustrated since these drives are known units of machine tools.

A first tool turret 50 is attached to the upper slide 36, a second tool turret 52 to the upper slide 40. These tool turrets are also designed in a known manner and attached to the associated upper slide so as to be each rotatable about an axis (indexing axis) parallel to the Z-axis and indexable further about this axis. As is known, such a tool turret can be equipped with a plurality of different tools, of which only two tools have been illustrated in FIG. 1, namely the tools 54 and 56.

Finally, FIG. 1 schematically shows a control 60 of the CNC automatic lathe, which is intended to be a stored-program control.

Insofar as the automatic lathe has been described in the above, it corresponds completely to the state of the art and so it is not necessary to illustrate further details in the drawings or to describe them.

Since the two cross slide systems 30 and 32 moving along the same Z-guide 24 or rather their facing tool turrets 50 and 52 must be prevented from colliding during the course of movements in the direction of the Z-axis but the two upper slides 36 and 40 only carry out movements in the direction of the X-axis, i.e. at right angles to the Z-axis, relative to the lower slides 34 and 38 bearing them, the means for carrying out the inventive process, when using the invention on machine components in the form of slides displaceable along a common guideway, are provided on these slides, i.e. in the automatic lathe illustrated in FIG. 1 on the two lower slides 34 and 38. For this reason, a first support 100 for a row of markings following one another in the direction of the Z-axis is secured to the lower slide 34, these markings having the shape of cams N1, N2, N3, N4 and N5, while a second support 102 which holds a sensor S for scanning these cams is secured to the lower slide 38; the sensor S is connected to the control 60 via a signal line 104 and has a scanning surface 106 which faces the row of cams or rather the backs of the cams and via which the sensor S can scan the cams N1 to N5 in a non-contact manner. Sensors of this type are known, i.e. in the form of inductive or capacitive proximity switches, with which the cams can be scanned when the latter consist of metal or are provided with a metal coating. In accordance with the invention, the cams N1 to N5 have a rectangular shape; the flanks of the cams N1 to N5 facing the second cross-slide system 32 have been designated as F1 to F5 in FIG. 1.

It is now assumed that the lower slide 34 of the first cross-slide system 30 is moved with the track speed V1 from left to right according to FIG. 1, i.e. towards the second cross-slide system 32, and that the lower slide 38 of the second cross-slide system 32 is moved with the track speed V2 from right to left according to FIG. 1, i.e. in the direction towards the first cross-slide system 30 so that the two cross-slide systems approach one another at the speed V1+V2. As long as the distance of the two cross-slide systems 30, 32 from one another, measured in the direction of the Z-axis, i.e. in the direction of the Z-guide 24, is greater than that illustrated in FIG. 1, i.e. as long as the sensor S has not yet reached the first support 100, there is no risk of collision, at any rate on the assumption that the support 100 is of such a length and attached to the lower slide 34 as well as the sensor S arranged relative to the lower slide 38 such that when the drives for the two lower slides 34, 38 which act in the direction of the Z-axis are switched off, the sum of the braking distances of the two cross-slide systems 30, 32 in the direction of the Z-axis, even at maximum track speeds V1 and V2 of the two lower slides 34, 38 in the direction of the Z-axis, is distinctly smaller than the distance of the two tool turrets 50 and 52 from one another, measured in the direction of the Z-axis (for all positions of the two cross-slide systems relative to one another, in which the sensor S is not yet located in the area of the support 100).

In accordance with the invention, the markings formed by the cams N1 to N5 are designed to be of different lengths and/or arranged at distances from one another of a varying size in the direction of the Z-axis, wherein the markings or cams N1 to N5 following one another in the direction in which the two cross-slide systems 30, 32 approach one another (in the direction of the Z-axis) become increasingly smaller and/or are arranged at increasingly shorter distances from one another. This also means, however, that when the two cross-slide systems approach one another the flanks F1 to F5 following one another in the direction of the Z-axis are arranged at distances from one another which become increasingly shorter, a measure which would, on its own, be sufficient for carrying out the inventive process, as will be shown in the following.

When the two cross-slide systems 30, 32 approach one another in the direction of the Z-axis and the sensor S has reached the row of markings or rather the support 100, the sensor S, in the embodiment illustrated in FIG. 1 and when the sequence of pulses generated with the aid of the sensor S is formed of pulses having a length which corresponds to the length, measured in the direction of the Z-axis, of the cam N respectively travelled over, generates a sequence of pulses, the consecutive pulses of which become increasingly shorter and are separated from one another by increasingly shorter time intervals, the duration of the individual pulses and the duration of the individual time intervals between consecutive pulses depending on the relative speed V1+V2 of the two cross-slide systems 30, 32 in relation to one another. If, on the other hand, the pulses of the sequence of pulses generated with the aid of the inventive apparatus were to be generated only by the flanks F1 to F5, all the pulses would be of the same length but the time intervals between consecutive pulses would become increasingly smaller. Therefore, while in the last-named case only the frequency of the sequence of pulses is, according to the invention, a function of the distance of the two cross-slide systems from one another as well as of the relative speed V1+V2, in the first-named case a sequence of pulses results, according to the invention, in which both the duration of the individual pulses and the frequency of the sequence of pulses are a function of the distance of the two cross-slide systems from one another as well as of the relative speed V1+V2. Since the avoidance of a collision presupposes that at the time the drive of a lower slide is switched off (when only this lower slide is moved) or the two drives for the two lower slides are switched off the distance of the two cross-slide systems or rather of the two tool turrets 50, 52 from one another, measured in the direction of the Z-axis, is at least as large as the braking distance of the moved lower carriage which is dependent on the speed or the sum of the braking distances of the two lower carriages which are dependent on the speed, the drive or drives can be switched off in good time by the control 60 since the sequence of pulses generated by the inventive apparatus supplies information in each of the two cases described above as to when the drive or drives must be switched off in order to prevent any collision of the two cross-slide systems or rather the two tool turrets, taking into consideration the relative speed of the two cross-slide systems in relation to one another, measured in the direction of the Z-axis, and, therefore, the required braking distance or rather the sum of the required braking distances.

Embodiments of the inventive apparatus are particularly preferred, in which the length of the markings or cams and/or the distances between consecutive markings or cams and/or the distances between consecutive flanks F1 to F5 of the cams—when the two machine components to be monitored are approaching one another—decrease harmonically (presupposing a constant relative speed of the two machine components in relation to one another).

Moreover, it is clear from the foregoing that the switching off of a drive can be replaced by a switching over of the drive, i.e. a reversal of the direction of movement of the machine component or machine components.

As already mentioned, a sequence of pulses, the frequency of which steadily increases at a constant relative speed, is generated by the inventive apparatus when the two machine components to be monitored, i.e. in the embodiment illustrated in FIG. 1 the two lower slides 34 and 38, travel towards one another. When a cut-off frequency is reached which results when the distance of the two machine components to be monitored from one another is no longer adequate for reliably braking these components down to a standstill at the given relative speed without a collision resulting, the risk of a collision must be expected. Since the frequency of the sequence of pulses is dependent on the relative speed of the two machine components to be monitored in relation to one another and on the distance of the two machine components from one another, the invention allows the maximum area of movement of the two machine components relative to one another, which is still safe, to be utilized to the full since the inventive monitoring of collisions does not react until the braking distance or the sum of the braking distances required for braking from the momentary relative speed down to a standstill is equal to the momentary distance of the two machine components from one another or slightly less.

The inventive collision monitoring may be realized from a technical point of view, for example, with the aid of a monostable trigger circuit provided in the machine control which is always triggered when the sensor generates a pulse and the self-locking time of which corresponds to the minimum period duration of the frequency of the sequence of pulses which is allowable for avoiding a collision. If the sensor generates a pulse while the trigger circuit is still in a self-locking state, there would be the risk of a collision between the two machine components to be monitored without a reaction from the inventive collision monitoring.

One of the technical realizations of the invention which is possible due to the apparatus according to FIG. 1 will now be explained in greater detail on the basis of FIG. 2. In the embodiment now to be discussed, the sensor S is intended to generate a sequence of pulses which each have a pulse duration corresponding to the length of the cam generating the pulse; in addition, the stored-program control 60 is intended to comprise a timer (a time-switch member) which is started by the leading flank of each pulse and has such a running time that there is the risk of a collision when the signal generated by the sensor S, by which the timer was last started, disappears during the running time of the timer because then the sensor S travels over such a short cam at such a great speed that the two machine components to be monitored have approached one another to a collision-critical distance.

Figure 2:
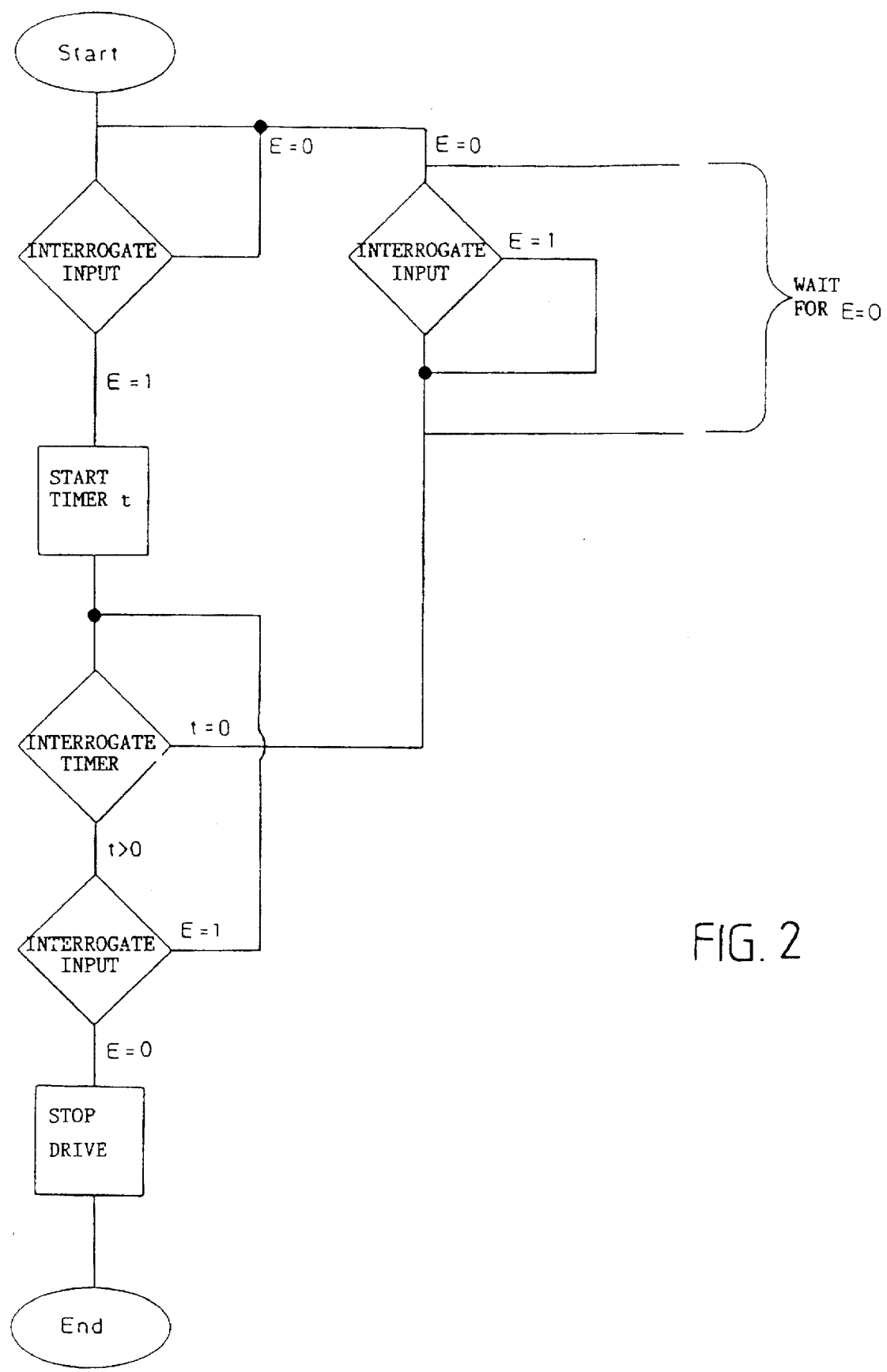
FIG. 2 shows a flow chart for the inventive process carried out by the control of the automatic lathe for the case where the duration of the pulses of the sequence of pulses generated according to the invention is equal to that time interval, during which the sensor moves along one of the cams forming the markings.

In such an embodiment, the collision monitoring designed in accordance with the inventive process is, as illustrated in the flow chart according to FIG. 2, started with the aid of the control 60 (cf. "Start" in FIG. 2), whereupon the input of the control 60 which is connected with the sensor S via the signal line 104 is interrogated to see whether a signal (pulse) is present at this input (E=1) or whether this is not the case (E=0)—cf. the step "Interrogate Input" in FIG. 2. If, in the case of the two cross-slide systems 30, 32 moving towards one another, the sensor S has not yet reached the support 100, the interrogation of the input will give the result E=0, whereupon the interrogation of the input will be repeated in accordance with the operating cycle of the control 60. When the sensor S has reached the support 100 and, with it, the first cam N1 or when the sensor S has reached one of the cams N2 to N5, the interrogation of the input will lead to the result E=1, whereby the timer is started—cf. the step "Start Timer" in FIG. 2. In accordance with the cycle of the control 60, checks are made again and again (cf. "Interrogate Timer" in FIG. 2) to see whether the timer has already run out; if this is not yet the case, i.e. the remaining running time t of the timer is still greater than zero (t>0), the input is again interrogated (cf. "Interrogate input" in FIG. 2) which, when E=1 results, leads to a renewed interrogation of the timer. If the pulse ends prior to the timer running out, the interrogation of the input leads to the result E=0, whereupon the control 60 switches off the drive or drives (cf. "Stop Drive" in FIG. 2) because the result of the interrogation of the input shows that too short a cam has been travelled over at too great a speed and, consequently, if the drive continues to run a risk of collision would threaten. The procedural cycle has therefore reached its end (cf. "End" in FIG. 2).

If the timer runs out (t=0) before the signal appearing at the input to the control 60 due to the cam last scanned has disappeared, it is first of all ascertained due to renewed or repeated interrogation of the input when this signal disappears (E=0)—as long as the interrogation of the input leads to the result E=1, the interrogation of the input is repeated according to a cycle—, and the entire procedure described in the above is repeated as long and as often as necessary until, after starting the timer, the interrogation of the input leads to the result E=0 as long as the timer is still running, i.e. its remaining running time t is greater than zero.

FIGS. 3 and 4 relate to the alternative described above, in which the sequence of pulses generated with the aid of the sensor is formed by short pulses which are to be allocated only to the respectively leading flanks of the markings or cams. In FIG. 3, the pulses following one another in time are plotted with the amplitude "A" over the time "t" as abscissa for the case of machine components or slides travelling towards one another, with the time unit intended to be one second. However, FIG. 1 shows only five markings or cams and so only five pulses could be generated whereas FIG. 3 applies to an apparatus, by means of which a greater number of consecutive pulses can be generated. In FIG. 3, the time intervals between consecutive pulses have been designated as $f_1^{-1}, f_2^{-1} \ldots$ to $f_n^{-1}$; the frequency of the sequence of pulses therefore decreases constantly. For FIG. 3, it is assumed that a risk of collision exists when the frequency of the sequence of pulses has increased up to a critical frequency $f_{krit}$ which is between the values $f_{n-1}$ and $f_n$ and so for the critical frequency of the sequence of pulses corresponding to the commencement of a risk of collision the following applies:

$f_{n-1} < f_{krit} < f_n$.

In FIG. 4 belonging to FIG. 3, the frequency f of the sequence of pulses is plotted as a function of the distance $\Delta Z$ (in meters) between the two machine components to be monitored for the case where the two machine components approach one another at a predetermined, constant relative speed. In the case of the sequence of pulses illustrated in FIG. 3, the frequency of the sequence of pulses then increases linearly with a decreasing distance, and at a distance of, for example, 0.2 m according to FIG. 4 the critical frequency of the sequence of pulses, designated in FIG. 4 as $f_{krit}$, is reached, and when this is exceeded a collision would occur.

By evaluating the sequence of pulses generated in accordance with the invention, any travelling apart of the two machine components can also be monitored when this is desired although, in this case, there is no risk of collision since a constant decrease in the frequency of the sequence of pulses results when the two machine components are travelling away from one another.

The longest and the shortest length of the markings or cams, the cut-off frequencies of the pulses and the admissible speed ranges depend on the resolution capacity of the sensor and the maximum possible processing speed of the pulses in the control.

As is shown in the foregoing, the invention has, inter alia, the following advantages: the largest possible area of movement of the monitored machine component or largest possible areas of movement of two moved and monitored machine components, simple and, therefore, extremely inexpensive apparatus for carrying out the inventive process, i.e. low expenditure on hardware but also low expenditure on software, low requirements with respect to computer power in the machine control and high functional reliability due to signals generated physically.

It is understandable on the basis of the preceding explanation of the invention that a collision between a machine slide and a stationary machine component can also be prevented with the invention. In this connection, it is to be envisaged that in modification of the machine illustrated in FIG. 1 only the second cross-slide system 32 is guided on the Z-guide 24 and the Z-guide is arranged such that this cross-slide system or rather the tool turret 52 could collide with the headstock 10 and/or the work spindle 16. In this case, it would merely be necessary to attach the support 100 stationarily in a corresponding manner and arrange the support 102 on the lower slide 38 such that its sensor S can scan the row of markings provided on the support 100.

As is already shown by the foregoing comments, the present invention can also be transferred easily to other constructions, in which at least one of the two machine components does not travel on a straight track but along a track shaped, for example, like a circular arc since, in such a case, it is only necessary to give the support for the row of markings a shape adapted to the shape of the track. It is likewise clear from the foregoing comments that the driven machine component can, for example, also be one which is rotated by the drive about an axis, such as is the case in a workpiece spindle drum of a multiple-spindle automatic lathe—strictly speaking, only one part of the driven machine component is then moved, of course, along a circular track.

What is claimed is:

1. Process for monitoring the movement of at least a first machine component moved by a drive along a predetermined path for avoiding any overtravelling of an end position admissible in relation to and defined by an actual position of a second machine component, characterized in that a sequence of pulses is generated during a movement of the first component by means of signal generating devices associated with the two machine components, said sequence of pulses having three parameters being (i) the distance between two consecutive pulses, (ii) the length of a pulse and (iii) the height of a pulse, at lease one of said parameters following a function of (a) the distance of the first component from said end position, measured in path direction, and of (b) the relative speed of the first component in relation to the end position, measured in path direction, and that the drive is controlled as a function of said sequence of pulses.

2. The process of claim 1, wherein the sequence of pulses is only generated from a predetermined distance of the first component from the end position onwards.

3. The process of claim 1, wherein for preventing collisions between the two machine components due to a movement of at least the first machine component along said path, at least one of said parameters follows a function of (a) the distance of the two components from one another, measured in path direction, and of (b) the relative speed of the two components in relation to one another, measured in path direction.

4. Apparatus for monitoring the movement of at least a first machine component moved by a drive along a predetermined path for avoiding any overtravelling of an end position admissible in relation to and defined by an actual position of a second machine component, wherein a support for a series of markings following one another in path direction is fixedly associated with said end position or the first component, and a sensor for scanning the markings and for generating a corresponding sequence of pulses—during a movement of the first component relative to the end position—is fixedly associated with the first component or the end position, said sequence of pulses having three parameters being (i) the distance between two consecutive pulses, (ii) the length of a pulse and (iii) the height of a pulse, wherein the markings are designed such that at least one of said parameters follows a function of (a) the distance of the first component from the end position, measured in path direction, and of (b) the relative speed of the first component in relation to the end position, measured in path direction, and wherein the sensor and the drive are connected to a drive control such that the drive is adapted to be switched off when a critical distance between the first component and the end position with respect to the relative speed is reached.

5. The apparatus of claim 4, wherein for preventing collisions between the two machine components due to a movement of at least the first machine component along said path, one of said components is provided with said support and the other component is provided with said sensor, and wherein the markings on the support are designed such that at least one of said parameters follows a function of (a) the distance of the two components from one another, measured in path direction, and of (b) the relative speed of the two components in relation to one another, measured in path direction, so that the drive is adapted to be switched off when a collision-critical distance between the two components with respect to the relative speed is reached.

6. The apparatus of claim 5, wherein the two components are designed as slides displaceable by separate drives on a common guideway.

7. The Apparatus of claim 6, wherein the two components are tool carrier slides of a machine tool.

8. The apparatus of claim 5 having a support for the sensor, wherein the support for the markings is arranged in relation to the one machine component and the sensor is arranged in relation to the other machine component such that the markings are adapted to be scanned by the sensor before the critical distance is reached, and wherein at least one of said supports is designed and arranged on the associated machine component such that at least one of said supports projects beyond the machine component associated with it in path direction and in a direction towards the respectively other machine component and that said supports together with said markings and said sensor do not collide when the two machine components approach one another.

9. The apparatus of claim 4, wherein the distance between consecutive markings measured in path direction become smaller in the direction of a decrease in the distance to be monitored.

10. The apparatus of claim 9 having an evaluation circuit for the sequence of pulses, the drive being adapted to be switched off by said evaluation circuit when after detection of a pulse by the evaluation circuit, the evaluation circuit detects a further pulse within a predetermined time interval.

11. The apparatus of claim 4, wherein the length of the markings measured in path direction becomes smaller in the direction of a decrease in the distance to be monitored.

12. The apparatus of claim 11 having an evaluation circuit for the sequence of pulses, the drive being adapted to be switched off by said evaluation circuit when the duration of a pulse detected by the evaluation circuit is shorter than a predetermined period of time.

13. The apparatus of claim 4, wherein the sensor is a scanning means actuatable in a non-contact manner.

14. The apparatus of claim 4, wherein the support for the markings is arranged in relation to the first machine component and the sensor is arranged in relation to the second machine component such that the markings are adapted to be scanned by the sensor before the critical distance is reached.

* * * * *